United States Patent
Yamakawa et al.

(10) Patent No.: US 8,694,246 B2
(45) Date of Patent: Apr. 8, 2014

(54) METHODS AND SYSTEMS FOR DISPLAYING ENHANCED TURN-BY-TURN GUIDANCE ON A PERSONAL NAVIGATION DEVICE

(75) Inventors: Devender A. Yamakawa, San Diego, CA (US); Babak Forutanpour, Carlsbad, CA (US); Daniel S. Baker, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/472,293

(22) Filed: May 15, 2012

(65) Prior Publication Data

US 2013/0311081 A1   Nov. 21, 2013

(51) Int. Cl.
*G01C 21/36* (2006.01)
*G01C 21/00* (2006.01)
*G01C 21/34* (2006.01)

(52) U.S. Cl.
CPC .............. *G01C 21/00* (2013.01); *G01C 21/34* (2013.01); *G01C 21/36* (2013.01)
USPC ............ 701/428; 701/410; 701/431; 701/436

(58) Field of Classification Search
CPC ......... G01C 21/00; G01C 21/34; G01C 21/36
USPC ................................. 701/428, 410, 431, 436
See application file for complete search history.

(56) References Cited

U.S. PATENT DOCUMENTS

| | | | |
|---|---|---|---|
| 6,611,753 | B1 | 8/2003 | Millington |
| 7,333,889 | B2 | 2/2008 | Hashizume |
| 7,920,968 | B2 | 4/2011 | Chapin et al. |
| 8,010,285 | B1 | 8/2011 | Denise |
| 2005/0119826 | A1 | 6/2005 | Lee et al. |
| 2005/0149252 | A1 | 7/2005 | Brulle-Drews et al. |
| 2006/0025923 | A1 | 2/2006 | Dotan et al. |
| 2007/0050133 | A1 | 3/2007 | Yoshikawa et al. |

(Continued)

FOREIGN PATENT DOCUMENTS

| | | | |
|---|---|---|---|
| EP | 1498696 A1 * | 1/2005 | |
| EP | 2075779 A1 * | 7/2009 | |
| WO | WO2010040385 A1 | 4/2010 | |

OTHER PUBLICATIONS

Partial International Search Report—PCT/US2013/041075—ISA/EPO—Aug. 26, 2013.

*Primary Examiner* — Tuan C. To
(74) *Attorney, Agent, or Firm* — James T. Hagler

(57) ABSTRACT

Embodiment methods and systems enable personal navigation devices to warn drivers during turn-by-turn navigation directions when they are approaching a difficult turn. Personal navigation devices may report to a server when a turn is missed during turn-by-turn directions, including identifying the turn and situation information. The server may aggregate missed turn reports from many personal navigation devices to generate a difficult turn database. Personal navigation devices may access the difficult turn database when generating turn-by-turn directions to identify turns requiring enhanced directions. The difficult turn database may be stored on personal navigation devices, and/or may be maintained on the server. Personal navigation devices may be configured to recognize when turns are intentionally missed, and only report missed turns when they determined that the turn was missed unintentionally. Indications of turn difficulty may be correlated to situation information received in missed turn reports to more accurately reflect when turns are difficult.

35 Claims, 10 Drawing Sheets

(56) References Cited

U.S. PATENT DOCUMENTS

| | | |
|---|---|---|
| 2008/0027646 A1 | 1/2008 | Kawabata |
| 2008/0208450 A1 | 8/2008 | Katzer |
| 2009/0171578 A1* | 7/2009 | Kim et al. .................. 701/210 |
| 2010/0030464 A1 | 2/2010 | Mittermaier |
| 2011/0053552 A1* | 3/2011 | Kim et al. ................ 455/404.2 |
| 2011/0071758 A1* | 3/2011 | Cho et al. ................... 701/211 |
| 2011/0184639 A1* | 7/2011 | Holsinger .................. 701/201 |
| 2011/0213548 A1* | 9/2011 | Tashiro ..................... 701/201 |
| 2011/0224898 A1 | 9/2011 | Scofield et al. |
| 2011/0238289 A1 | 9/2011 | Lehmann et al. |
| 2011/0282576 A1* | 11/2011 | Cabral et al. ............... 701/201 |
| 2012/0143504 A1* | 6/2012 | Kalai et al. ................. 701/533 |
| 2012/0166078 A1* | 6/2012 | Choi ......................... 701/436 |
| 2012/0239584 A1* | 9/2012 | Yariv et al. ................. 705/319 |
| 2012/0254804 A1* | 10/2012 | Sheha et al. ............... 715/834 |
| 2013/0191020 A1* | 7/2013 | Emani et al. ............... 701/468 |
| 2013/0261960 A1* | 10/2013 | Wu et al. .................... 701/465 |

* cited by examiner

METHODS AND SYSTEMS FOR DISPLAYING ENHANCED TURN-BY-TURN GUIDANCE ON A PERSONAL NAVIGATION DEVICE

BACKGROUND

Personal navigation devices such as global positioning systems in use today provide turn-by-turn directions from the current location of the device to a destination selected and input by the user. While some personal navigation devices allow the user to determine the level of prompting provided by the device, most do not allow such customization and always provide the same level of prompting for every turn along a designated route. Even the devices that allow a user to select the desired level of prompting provide the selected level of prompting for all turns, and do not have the capability to vary the level of prompting provided without further user input.

The problem with the current state of the art is that not all turns along a designated route require the same level of prompting from a personal navigation device. Some turns are simply easier to execute than others. Some turns are easily executed under certain circumstances but become difficult to execute under other circumstances such as heavy traffic or in rain. The current personal navigation devices do not have the capability to consider any of these situational factors when prompting the user of an upcoming turn.

SUMMARY

In the various embodiments, a personal navigation system may determine when a user fails to make a scheduled turn during turn-by-turn directions, and report information regarding the missed turn and local conditions to a central server. The server may use information received from many personal navigation devices to generate a database of difficult turns. Information on difficult turns, such as a data table or database listing such turns, may be transmitted to personal navigation devices for storage in local memory. The personal navigation systems may use such information on difficult turns to provide enhanced turn-by-turn directions, which may include providing additional or more emphatic warnings to drivers when they approach a turn identified as difficult. Information on difficult turns may be correlated in the provided database with time of day, day of week, day of year, season, temperature, precipitation, and other factors which may impact the ease by which drivers may achieve a given turn.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

DETAILED DESCRIPTION

Figure 1:
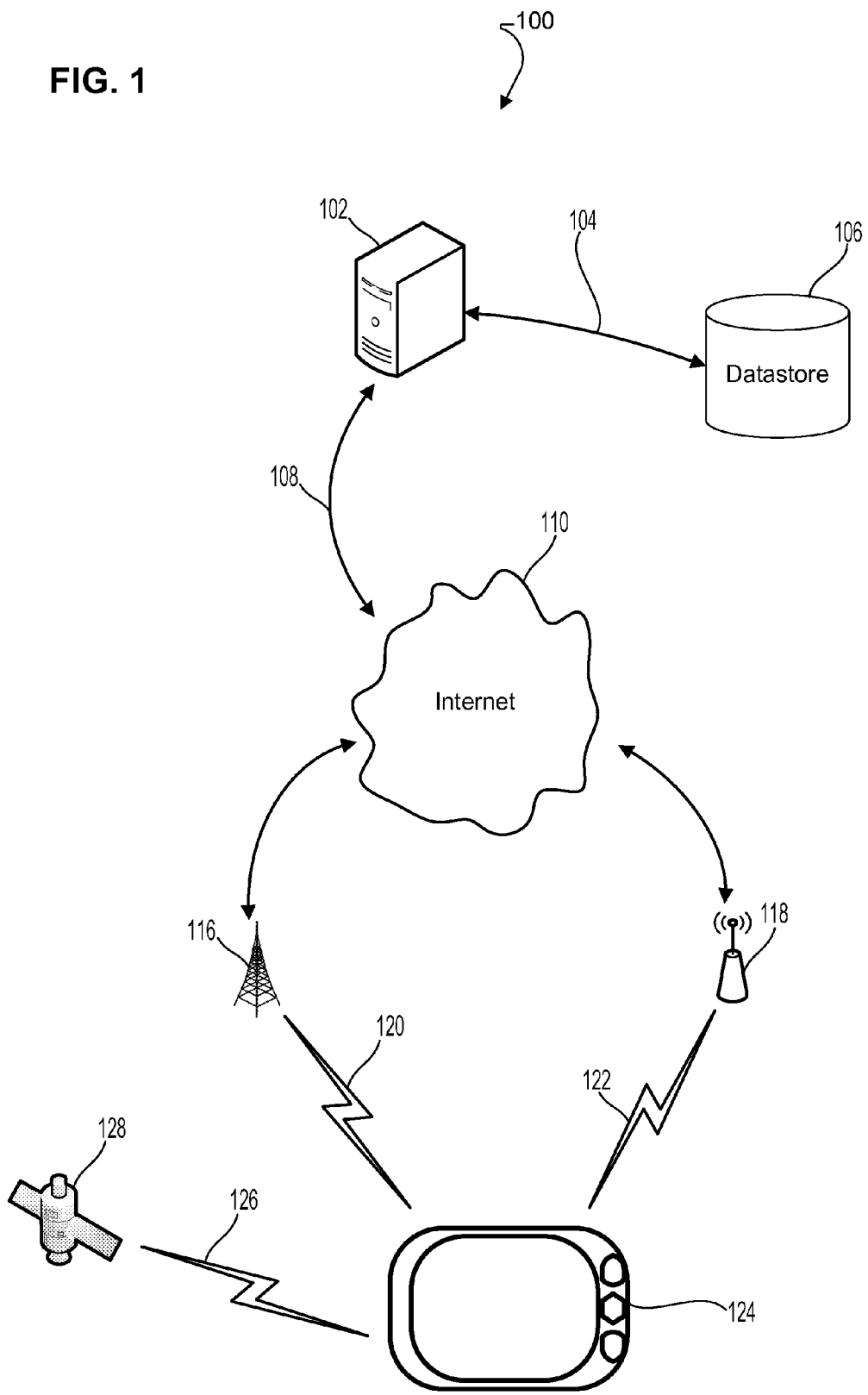
FIG. 1 is a communication system block diagram of an embodiment system.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "personal navigation device" refers to a variety of computer devices that may be configured with a navigation system capable of providing turn-by-turn directions, including but not limited to Global Positioning System (GPS) receivers, GPS receivers within vehicles (e.g., automobiles), cellular telephones, smartphones, personal data assistants (PDAs), tablet computers, palm-top computers, notebook computers, and other portable programmable computing devices.

The various embodiments enable providing enhanced navigation directions on a personal navigation device ("PND" in the drawings). A typical personal navigation device may be configured to accept a destination from a user, formulate a driving route to the selected destination, provide turn-by-turn instructions to the user visually and/or aurally, and monitor the movement of the device as the user follows the driving directions. In the various embodiments, the personal navigation system may also determine when the user fails to make a scheduled turn, and then report that information to a central server, which can use information from many such personal navigation devices to generate a database of difficult turns. Information on difficult turns, such as a data table or database listing such turns and providing a difficulty indication for at least some of the turns, may then be transmitted to personal navigation devices, which may use such information to provide enhanced turn-by-turn directions. Such enhanced turn-by-turn directions may include providing additional warnings to drivers when they are approaching a turn identified in the database as difficult. In this manner, personal navigation devices can learn as a system from the collective experience of all drivers and users of personal navigation devices in order to provide an enhanced user experience.

Typically personal navigation devices use signals from the global positioning system (GPS) to determine the geographic location of the device. However, position determination may also or alternatively be accomplished via use other types of radio signals, cellular signals (e.g., cell tower IDs communicated in cellular communications), WiFi signals, and any other technology capable of enabling devices to identify their position on the surface of the earth.

Like conventional personal navigation devices, a user may input a desired destination such as via a key pad or a voice recognition system. The processor in the personal navigation device may be configured to determine the current location and calculate a route to the selected destination. When the route is calculated, or as the user proceeds along the designated route, the personal navigation device processor may access a database of difficult turns to identify those turns along the route with a high degree of difficulty, or receive a difficulty indication for those turns designated as being difficult. When the vehicle approaches a difficult turn the personal navigation device may provide an enhanced instruction, such a warning that the turn is "tricky" or "difficult," or provide more frequent warnings about the impending turn (e.g., every 100meters instead of every half mile or kilometer). The type, detail, and timing of enhanced instructions may vary depending upon the degree of difficulty of each turn as indicated by data in the difficult turn database.

In an embodiment, the database of difficult turns may be stored locally in the personal navigation device (i.e., in a local database of difficult turns). In alternative embodiment, the database of difficult turns may be stored on a central server which the personal navigation device processor can access, such as through a wireless communication link when planning a route or during travel.

The database of difficult turns may be generated by aggregating missed turn reports from many personal navigation devices for a long period of time into a consolidated database. Such missed turn reports may identify the turn that was missed, and provide situation information from the time of the missed turn, such as time of day, day of year, weather conditions (e.g., outside temperature and whether the windshield wipers were activated), speed and direction of travel, average speed, etc. A central server may aggregate and correlate this information into a database that is organized to identify different levels or indications of difficulty for particular turns correlated to times of day and calendar date (which may affect lighting conditions), time of day and day of week (which may correlate to traffic conditions), day of year (which may correlate to effects due to foliage or snow), speed and direction of travel, external temperature (which may correlate to ice or snow conditions), and other parameters that may be measured by a personal navigation system.

Collecting data on many situation parameters and correlating turn difficulty with parameters which a vehicle or personal navigation system can measure or access enables the database to provide more relevant indications. For example, some turns may only be difficult under particular circumstances, such as at night, in the rain and/or during the summer months when foliage may cover a street sign. The personal navigation device processor can then use measured and gathered parameters to query the difficult turn database in order to obtain a difficulty value or indication under current conditions.

If during a planned route the personal navigation device determines that the driver has missed a turn, the processor of the device may evaluate subsequent movements to determine whether the turn was missed intentionally. For example, if the vehicle proceeded to a different destination, the device may presume the turn was not taken intentionally. On the other hand, if the vehicle promptly makes a U-turn or makes a sequence of prompt turns to get back on route, the device may conclude the turn was missed unintentionally. If the personal navigation device processor determines that the turn was missed intentionally, the missed turn is ignored and the personal navigation device may continue with turn-by-turn guidance as normal.

However, if the personal navigation device processor determines that the turn was missed unintentional, the personal navigation device processor may collect situational data, such as the time of day and time of the year, weather (e.g., outside temperature and whether the windshield wipers were activated), lighting conditions (e.g., whether the headlights were on), speed and direction of travel, traffic conditions, etc. The situational data may also include the type of vehicle being driven, since some vehicles have better cornering capabilities than others. The situational data may be collected from subsequent positions of the device (indicating direction of travel and turns), various vehicle sensors, and external sources such as weather reporting services and traffic reporting services. Situational data from external sources may be collected by the personal navigation device processor contemporaneously with the missed turn, or it may be combined with missed turn data at a later time, either by the personal navigation device processor or by the central server after the missed turn data is uploaded by the personal navigation device. The personal navigation device processor may assemble the situational data and missed turn location into a message that it may transmit to a central server via an available communication network. The message transmission may be made contemporaneously with the missed turn, or stored in memory in the personal navigation device and transmitted at a later time, such as when the personal navigation device has access to a WiFi network with access to the Internet.

Upon receiving the transmission, the central server may store the data in a database of missed turns. The central server may aggregate the data from multiple messages received from multiple personal navigation devices over a period of time into a database of difficult turns. The difficulty of a particular turn may be assessed based on the frequency of missed turn reports for that turn. As mentioned above, the difficulty of a turn may vary depending upon the time of day (e.g., at night or when the sun is low on the horizon), day of year, weather conditions, traffic conditions, etc. The difficulty of the turn may also depend upon the type of vehicle, as top-heavy sport-utility vehicles may have a difficult time with tight turns which are handled easily by small sports cars. Therefore, in aggregating data on difficult turns the central server may correlate the missed turns to the situation information reported at the time, such as to generate different difficulty values or indications based upon one or a combination of particular situation parameters. All difficult turns and situational parameters may be assembled into a master database of difficult turns in a format that can be accessed by or communicated to personal navigation devices.

In an embodiment of a difficult turn database, the difficulty of each turn may be classified in a variety of ways. For example, a relative difficulty value (e.g., a number between 1 and 10, 0 and 100, or 0 and 1) may be assigned to the turn under each of the various situational parameters. Alternatively, turns may be assigned a difficulty indicator, such as "difficult" or "not difficult." These values and indications may be calculated or based on missed turns statistics derived from many missed turn reports received from many personal navigation devices over a protracted period of time. The more reports that are received and the greater the time over which such reports are received, the better such statistics will become, and thus the better the value or indication of difficulty may be determined. In an embodiment, the difficult turn database may be generated based upon a large database of missed turn reports. In another embodiment, the difficult turn database may be incrementally developed, with each one or a few missed turn reports being used to adjust the difficulty values and corresponding parameters appropriately. In a further embodiment, a large group of missed turn reports may be used to generate an initial difficult turn database, which is then incrementally refined as subsequent missed turn reports are received.

In an embodiment, the central server may periodically broadcast or multicast the database of difficult turns to all subscribing personal navigation devices, which in turn may store the data in memory, such as in their respective internal databases of difficult turns. Alternatively, each personal navigation device may access the central server periodically, such as via a wireless communication network, and download to local memory the latest database of difficult turns. In another embodiment, each personal navigation device may access the central server while the user is driving, such as via a wireless communication network, and download to local memory a subset of difficult turns which the driver is approaching along the planned route. These embodiments enable the personal navigation devices to use the most recent difficult turn database when generating enhanced turn-by-turn directions as described above.

In an embodiment, the driver may place the personal navigation device in a "caravan mode" whereby personal navigation devices in two or more vehicles traveling together may communicate with each other. If the driver of the lead vehicle misses a planned turn, the personal navigation device in that vehicle may immediately send a message via radio signal to the personal navigation devices in the following vehicles which are part of the caravan of vehicles traveling together. Those following personal navigation devices may then alert the drivers in the respective vehicles that the first vehicle missed a turn and provide enhanced instructions to those drivers related to the planned turn.

In an embodiment, the personal navigation device processor may record routes driven by the user, whether the personal navigation device is providing navigation guidance at the time or not, in a database of frequent routes. Using this information, the personal navigation device processor may determine whether a given route is familiar to the user when generating turn-by-turn directions to an indicated destination. For example, when a user requests driving directions from the user's home to a distant location, portions of the route in the vicinity of the user's home are likely to be driven quite frequently. By recognizing that a current portion of the calculated route is familiar to the user, the personal navigation device may provide normal (i.e., not enhanced) turn-by-turn directions even if a turn along the familiar portion of the route is listed in the difficult turn database as being particularly challenging. Thus, the personal navigation device may keep track of the fact that the user frequently accomplishes particular turns without difficulty even though they are listed in the database of difficult turns, and suppress enhanced driving directions for those portions. Further, the personal navigation device may skip the familiar portions of the route altogether, such as by providing a single driving instruction to drive to a particular location (e.g., "take I-95 North") that is on the boundary of the user's frequent driving.

In a further embodiment, the personal navigation device may keep track of the user's driving routine to identify turns along frequently driven routes with which the user frequently has difficulty. For example, if the personal navigation device recognizes that the user frequently performs a U-turn around a particular intersection, the personal navigation device may record that turn as being difficult in its locally stored difficult turn database. Then, when providing turn-by-turn driving directions which include that particular turn, the personal navigation device may provide enhanced instructions for that turn, even if the turn is not indicated as being difficult in the difficult turn database provided by the central server and the turn is familiar to the user. Thus, if a particular turn does not appear in the difficult turn database, but the personal navigation device's database of frequently driven routes indicates the user has missed the turn a number of times, the personal navigation device may provide enhanced instructions to the user when approaching that turn. In this manner, even if a given turn is not missed by enough drivers to be classified as being difficult in the difficult turn database provided by the central server, those drivers who frequently miss that turn may still receive enhanced instructions from their personal navigation devices.

Since personal navigation devices may have multiple users, such as when a vehicle equipped with a personal navigation device or a mobile personal navigation devices used by more than one person in the family, the personal navigation device may maintain a database of frequent routes for each user. Thus, if one user frequently misses a particular turn but the other users do not, the personal navigation device may issue enhanced instructions for the user who frequently misses the turn, but not for the other users. In order to support this capability, users may login or otherwise identify themselves to the personal navigation device when it is activated. Alternatively, the personal navigation device may be configured to recognize a particular user based upon recognizable characteristics, such as voice, seat position, steering wheel position, radio station selections, or driving patterns, and record driving patterns for recognized users.

In situations where the personal navigation device has sufficient sensitivity to determine the lane of traffic on a multi-lane road in which user is driving, the turn-by-turn directions may be enhanced to provide the driver with earlier or more frequent instructions if a given turn will require the driver to change lanes in advance. Such enhanced term-by-turn directions may not be provided if the vehicle is already in the necessary lane to make the turn.

The enhancements to turn-by-turn directions may take many forms, and may vary as necessitated by the given turn and situational parameters. For example, the enhancement to turn-by-turn directions may be as simple as alerting the driver to an upcoming turn earlier than normal. As another example, a difficult turn may be identified aurally and/or with an icon or other visual indication on the display screen of the personal navigation device. As another example, the enhanced directions may take the form of more specific instructions to the driver, such as "merge into the right lane when able and slow down. Difficult right turn in one quarter mile" versus simply "right turn ahead." In a further example, the personal navigation device may identify the characteristics of a particular turn that make it difficult, such as "street sign may be obscured by foliage," or "next turn difficult to make during inclement weather," or "slow down for the next turn." As a further example, audible tones or beeps maybe sounded to alert the driver that the approaching turn is difficult. Any form of enhancement or combinations of enhancements which serve to alert the user of a difficult turn may be used.

In an embodiment, the personal navigation device may interface with the driver's mobile phone or other device to provide an additional enhancement to turn-by-turn directions. For example, the personal navigation device may connect via Bluetooth® to the driver's cell phone and cause the cell phone to vibrate or perform some other function to alert the driving of an upcoming difficult turn. In another embodiment, the personal navigation device may connect to the vehicle's sound system to provide enhanced directions or some alert signal to notify the driver of an upcoming difficult turn over the vehicle's speakers. In another embodiment, the personal navigation device may interface with the vehicle's sound system to temporarily mute or otherwise lower the volume of the sound currently playing on the sound system so that the navigation alert may be heard by the driver.

FIG. 1 illustrates system components and interrelationships between personal navigation devices and a central server according to an embodiment. Personal navigation devices 124 typically will include a GPS receiver that may determine its position from GPS signals 126 received from a number of GPS satellites 128, and a processor configured to use the position information in conjunction with map data stored in memory to calculate a route to the destination and generate turn-by-turn directions. When the processor in the personal navigation device 124 determines that the user has missed a turn and that the missed turn was unintentional, as described in more detail below, the personal navigation device processor collects situational data and transmits a missed turn report to a central server 102. Such missed turn reports may be transmitted via a communication network, such as by cellular network transmissions 120 to/from a cellular data network 116 (e.g., a 3G, 4G, or LTE network) coupled to the Internet 110, and/or via WiFi signals 122 to/from WiFi transceiver 118 coupled to the Internet 110. The central server 102 receives the missed turn reports, and stores the data in a datastore or memory 106.

The central server 102 may analyze the missed turn data received from multiple personal navigation devices and stored in the memory 106 to identify particular turns which are frequently missed by drivers, and calculate a degree or indication of difficulty of such turns. Missed turns which meet designated criteria may be combined in a database that is referred to herein as a difficult turn database. The server may transmit (e.g., broadcast or multicast) the difficult turn database to personal navigation devices 124 over the Internet 110 via a cellular data network 116 and/or a WiFi network 118. The personal navigation devices 124 may then use that database in generating enhanced turn-by-turn directions as described herein.

Figure 2:
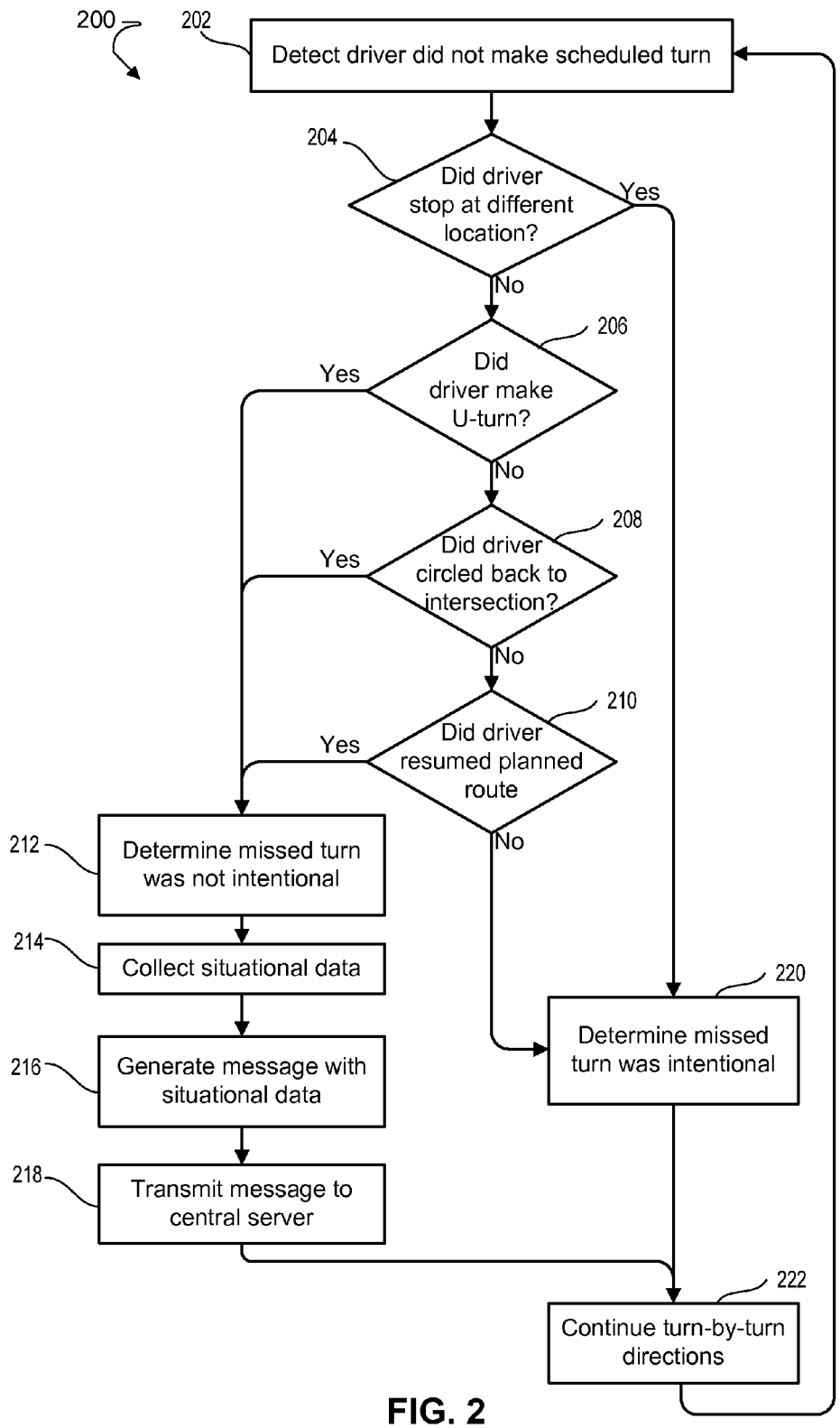
FIG. 2 is a process flow diagram of an embodiment method for determining when a turn is missed intentionally or unintentionally, gathering related data collection and transmitting a missed turn report according to an embodiment.

An embodiment method 200 by which a personal navigation device may determine whether a turn was missed intentionally or unintentionally is illustrated in FIG. 2. In method 200 in block 202, while providing turn-by-turn directions along a planned driving route, a personal navigation device processor may detect when that the driver fails to make a scheduled turn on the planned route. A missed turn may be detected by noting when the current location and direction of travel no longer correspond to the planned route. Alternatively, a missed turn may be detected when the personal navigation device begins recalculating a route to the destination or generates directions for returning to the originally calculated route. In order to determine whether the turn was missed intentionally or unintentionally, the processor may monitor the subsequent position or path of the vehicle and perform a series of determinations designed to infer the driver's intentions. For example, in determination block 204, the personal navigation device may monitor the travels of the vehicle to determine whether the user ultimately stopped at a location different from the previously entered destination. Stopping at a different location may indicate that the user changed his or her mind, or is making a pit stop, so in that case (i.e., determination bock 204="Yes") the processor may determine that the turn was missed intentionally in block 220. When the processor determines that a turn was missed intentionally in block 220, processor may not report the event and may resume providing turn-by-turn directions in block 222.

If the user does not stop at a different destination (i.e., determination block 204="Yes"), the personal navigation device processor may determine whether the user promptly made a U-turn and back to the intersection where the scheduled turn should have been made in determination block 206. Making a U-turn and returning to the intersection where the turn was missed provides good evidence that the turn was missed unintentionally, which is a conclusion that may be reached in block 212. If the user did not promptly make a U-turn (i.e., determination block 206="No"), in determination block 208, the processor may continue to monitor the travel of the vehicle to determine whether the user circled back to the intersection where the turn was missed in some other way. If the processor determines that the user made a series of turns in order to return to the missed intersection (i.e., determination block 208="Yes"), this may provide good evidence that the turn was missed unintentionally, which is a conclusion that may be reached in block 212.

If the user continues driving in a manner that does not circled back to the intersection (i.e., determination block 208="No"), the processor may continue to monitor the path followed by the vehicle to determine whether the driver resumed the planned route at a later point in determination block 210. For example, user may make a series of turns in order to reacquire the planned route. Such turns may be according to turn-by-turn directions provided by the personal navigation device. Thus, if the user promptly gets back on the planned route (i.e., determination block 210="Yes"), this may provide good evidence that the turn was missed unintentionally, which is a conclusion that may be reached in block 212.

The series of determinations illustrated in FIG. 2 is provided as an example of the types of determination that a processor of a personal navigation device may make in order to conclude whether a turn was missed intentionally or unintentionally. In general, if the personal navigation device provides corrective turn-by-turn directions, such as to return the driver to the missed turn or to reacquire the planned route, and the user compliance with those directions, this would provide good evidence that the turn was missed unintentionally, which is a conclusion that may be reached in block 212. On the other hand, if the driver takes no actions to reacquire the planned route (i.e., each of determination block's 204, 206, 208, 210="No"), this may provide good evidence that the turn was missed intentionally, which is a conclusion that may be reached in block 220. Again, when the processor determines that a turn was missed intentionally in block 220, processor may not report the event and may resume providing turn-by-turn directions in block 222.

If the personal navigation device processor concludes that the turn was missed unintentionally (i.e., any of determination block's 206, 208, 210="Yes"), in block 214 the personal navigation device processor may collect situational information that may be relevant to the reasons the turn was missed. Such situational information may include, for example, time of day, day of year, weather conditions (such as indicated by outside temperature, presence of moisture on the windshield, activation of the windshield wipers, etc.), speed and direction of travel, like conditions (such as indicated by whether the vehicle headlights were on), and traffic conditions. The processor may assemble the collected situational information and information identifying the missed turn (e.g., coordinates, intersecting streets, address, etc.) into a missed turn report message in block 216, and transmit the missed turn report message to a central server in block 218. The missed turn report message may be transmitted promptly, such as if a wireless communication network connection is available to the processor. Alternatively, the generated missed turn report message may be stored in memory as part of block 216, and transmitted in block 218 at a later time, such as when the personal navigation device establishes connection with a wireless (or wired) communication network, such as the user's home Wi-Fi network. The personal navigation device may continue providing turn-by-turn directions for the remainder of the planned route in block 222.

The process of detecting missed turns and evaluating whether a turn was missed intentionally may continue throughout a session of turn-by-turn directions, so the processor may return to block 202 the next time it detects that a scheduled turn is missed. Thus, multiple missed turn reports may be generated by a personal navigation device during a single session of turn-by-turn directions.

An embodiment method 300 by which a processor of a personal navigation device may utilize a difficult turn database to provide enhanced turn-by-turn directions, as well as report missed turns, is illustrated in FIG. 3. In method 300 at block 302, the processor of a personal navigation device may receive inputs from the user specifying a desired destination for which turn-by-turn directions are desired. In block 304, the processor may determine a current location, such as by receiving location data from a GPS receiver within the personal navigation device. In block 306, the processor may calculate a driving route from the current location to the desired destination, such as by using map data stored in memory, and generate turn-by-turn directions along the calculated route. Using the calculated route, the processor may access a difficult turn database to determine a degree or indication of difficulty for each turn along the calculated route in block 308. As part of accessing the difficult turn database, the processor may use the current time and date as part of the search or data access criteria to obtain time/date relevant difficulty values/indications. Also, the processor may access the difficult turn database using information obtained from various vehicle state and sensor data, such as whether the windshield wipers are activated, the speed of the vehicle, external temperature, etc. For example, if the windshield wipers are activated, the processor may query the database for turn difficulty values/indications at the present time and date in the presence of rain. As another example, if the windshield wipers are activated and the outside temperature is less than 32 degrees Fahrenheit, the processor may query the database for turn difficulty values/indications at the present time and date in the presence of snow or sleet. Also or alternatively, the processor may access external data sources, such as a weather station or website, to determine current conditions that may be correlated in the difficult turn database (e.g., forecasts for rain or snow). In block 310, as the user proceeds along the calculated route, the personal navigation device processor may issue turn-by-turn directions, which may include a warning when a difficult turn is being approached. The degree of enhancement to the turn-by-turn directions provided in block 310 may be based on the degree of difficulty of each turn under the current conditions that was obtained from the difficult turn database in block 308.

Figure 5:
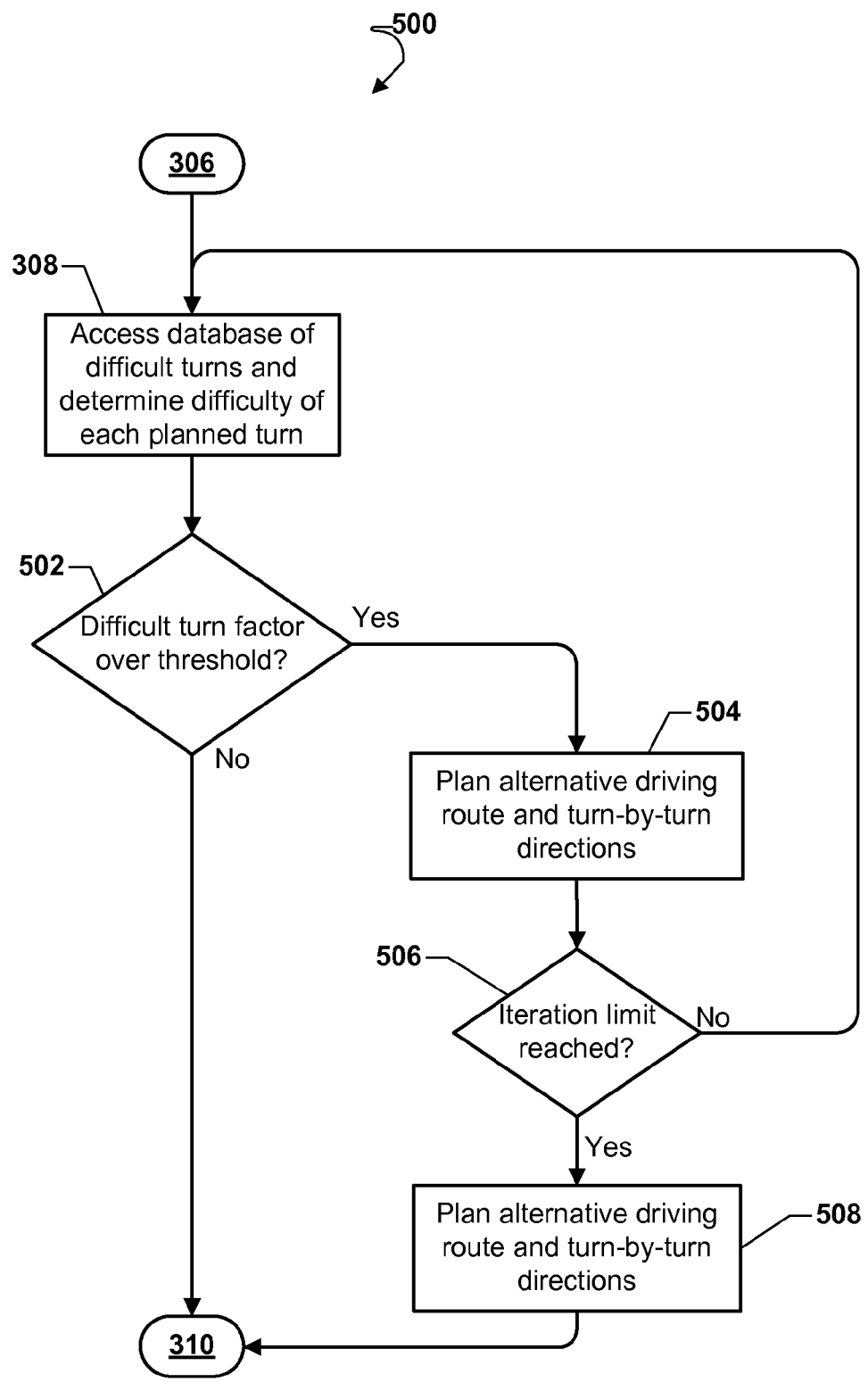
FIGS. 5-7 are process flow diagrams of embodiment methods for planning alternative driving routes based on the difficult turn database.

In an embodiment method 500 illustrated in FIG. 5, a driving route is planned in block 306 and the database of difficult turns is accessed in block 308, both as described above with reference to FIG. 3. In determination block 502, the processor may compare the overall difficulty of the planned routes against a predefined threshold. If the overall difficulty is less than the predefined difficulty threshold (i.e., determination block 502="No"), guidance may proceeds normally in block 310 described above with reference to FIG. 3. However, if the overall difficulty of a planned route exceeds the predefined threshold (i.e., determination block 502="Yes"), the processor may plan an alternative route in block 504, such as a route which has fewer difficult turns than the route originally calculated in block 306. Such alternative routes may be slightly longer than the route originally planned in block 306, but may be easier for the driver to navigate under current conditions, such as time of day and weather. To prevent infinite looping, the processor may determine whether a predetermined number of iterations have been performed in determination block 506. If not (i.e., determination block 506="No"), the processor may access the database of difficult turns in block 308 and continue the process as described above. If the iteration limit has been reached (i.e., determination block 506="Yes"), the processor may select the easiest of the previously planned routes in block 508 and provide guidance normally in block 310 as described above with reference to FIG. 3.

Figure 6:
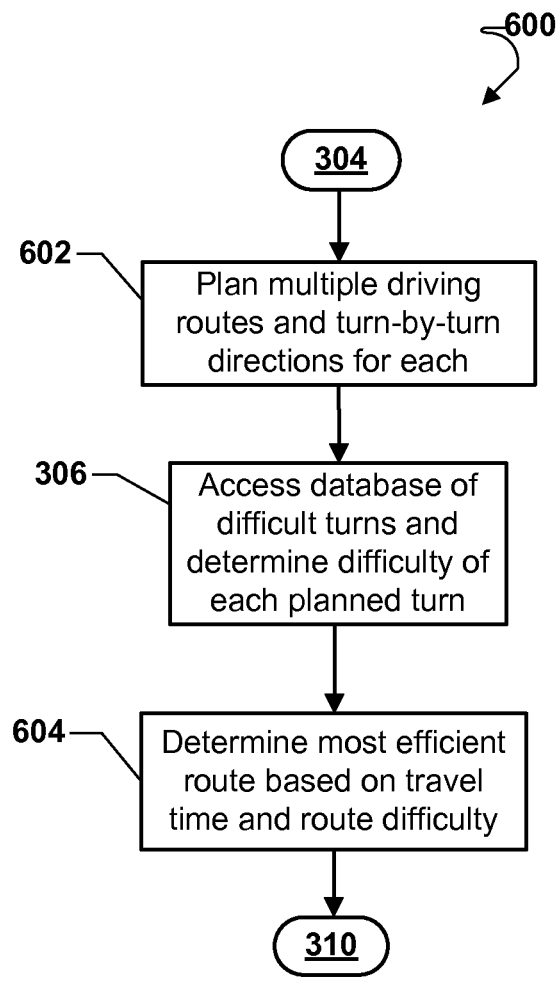

Alternatively, in an embodiment method 600 illustrated in FIG. 6, the processor may calculate multiple alternative routes in block 602. In block 308, the processor may access the database of difficult turns and calculate the difficulty of each planned route. The processor may compare the travel time and difficulty of each route and select the most efficient route in block 604, and provides guidance normally in block 310 as described above with reference to FIG. 3.

Figure 7:
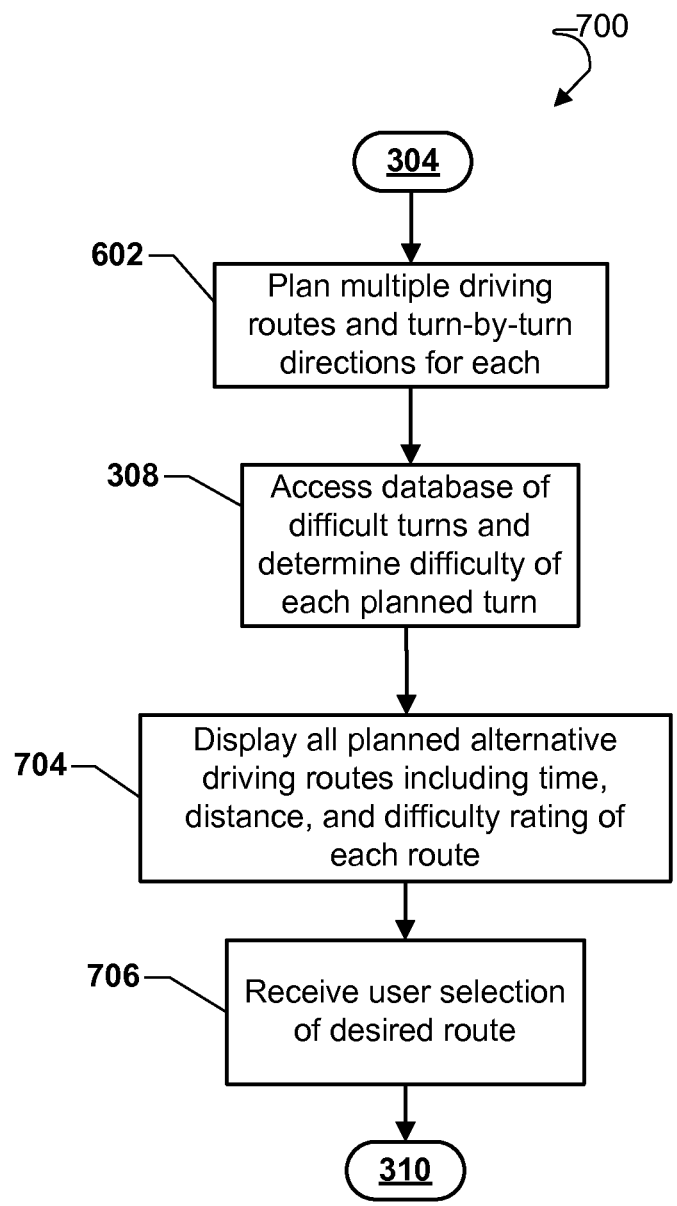

In another method 700 illustrated in FIG. 7, multiple routes may be planned in block 602 as described above. The processor may access the database of difficult turns to determine the difficulty of each planned route in block 308. In block 704, the processor may display each of the alternative planned routes along with the distance, driving time and difficulty rating of each route. The processor may receive the user's selection of a desired route in block 706, and provides guidance normally in block 310 as described above with reference to FIG. 3. While monitoring the current location of the vehicle, the processor of the personal navigation device may detect when/ if the driver does not make a scheduled turn in block 312. As mentioned above, a missed turn may be detected by noting when the current location and direction of travel no longer correspond to the planned route. Personal navigation devices commonly begin to issue turn-by-turn instructions for returning the driver to the planned route, such as indicating that the driver should make a U turn. Alternatively, the use may manually indicate whether a turn was missed intentionally or unintentionally, such as by pushing a button on the personal navigation device.

When the processor detects a missed turn in block 312, the processor may begin to monitor the subsequent movements of the vehicle to determine whether the turn was missed intentionally in determination block 314. An example method 200 for making this determination is discussed above with reference to FIG. 2. However, other methods or algorithms may be used, including asking for a user input (such as a button press or verbal command) If the processor determines that the missed turn was intentional (i.e., determination block 314="Intentional"), the processor may disregard the missed turn and continue to provide turn-by-turn directions as normal. If the processor determines that the missed turn was unintentional (i.e., determination block 314="Unintentional"), the processor may calculate various situational statistics, time of day, day of year, traffic conditions or travel speed, weather (e.g., whether the windshield wipers were activated), and direction of travel in block 316. In block 318 the processor may generate a message including location information on the missed turn (e.g., GPS coordinates, intersecting streets, address, etc.) and the gathered situation data, and transmit the message to a central server in block 320. This transmission may be made at the time of the missed turn such as by a wireless communication link (e.g., a cellular data link via a vehicle transceiver), or at a later time, such as when the vehicle reaches a location where a WiFi data link is available (e.g., in the owner's garage).

Figures 3A, 3B:
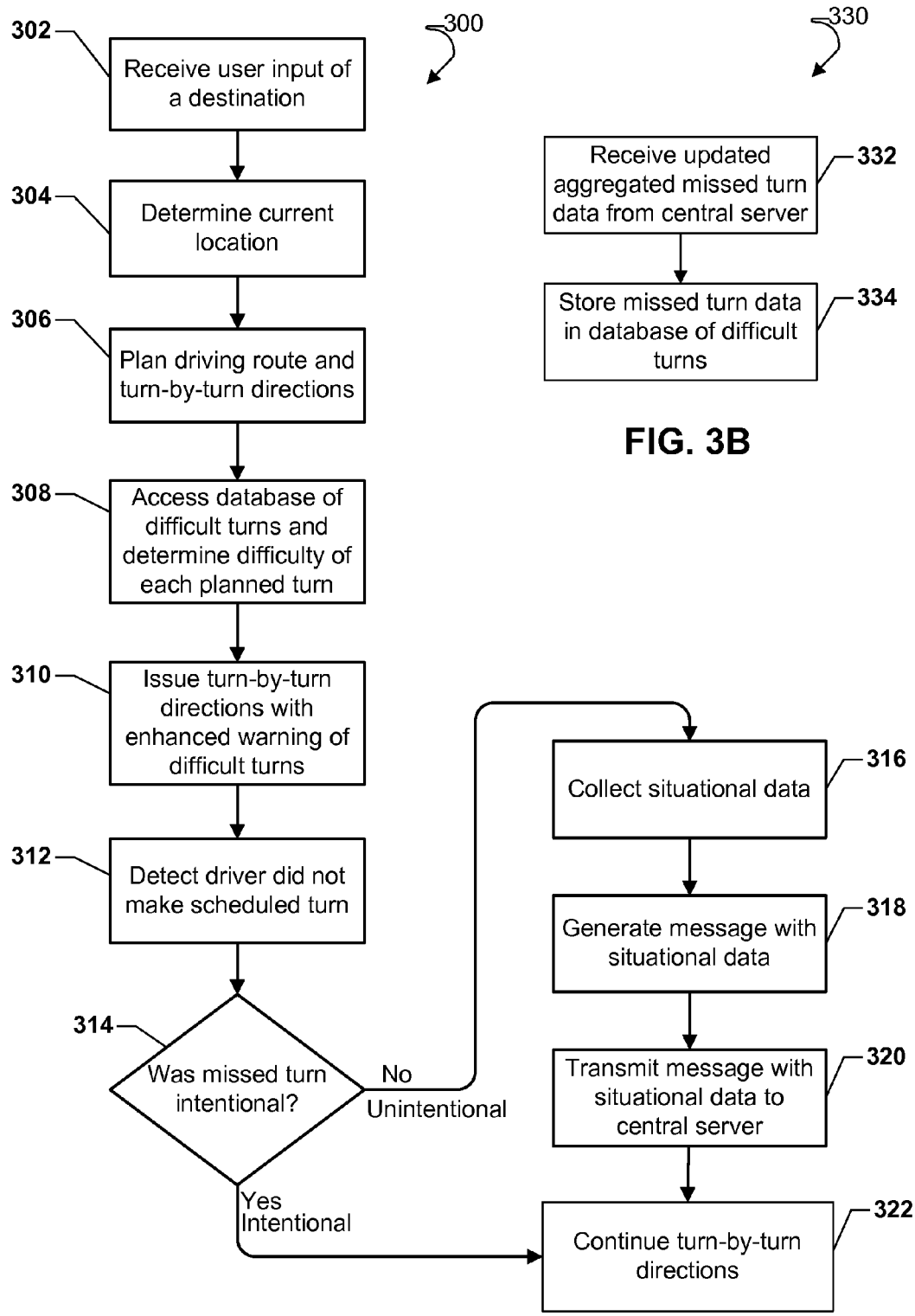
FIG. 3 is a process flow diagram of an embodiment method for implementing enhanced turn-by-turn directions and reporting missed turns according to an embodiment.

Periodically the central server may provide updated aggregated data on all missed turns and transmit that database to subscribing personal navigation devices. An example method 330 for accomplishing this is illustrated in FIG. 3B. In method 330 in block 322, the processor of a personal navigation device may receive updated aggregated missed turn data from a central server, and in block 324 the processor may store the data in memory of the device. Alternatively, the processor in the personal navigation device may be configured to periodically query the central server for updated aggregated data, such as by accessing a website or URL via a wireless data link, download the database (or an update to the database) from the central server, and store the data in memory of the personal navigation device. Such data may be in the form of annotations to map data, a data table of particular coordinates or street intersections, or other data structures that the processor of the personal navigation device can use to recognize when a planned route will encompass a difficult turn. Additionally, the data may correlate difficult turns with information related to time of day, day of year, weather conditions, etc. that the server has determined contribute to or are correlated with frequent missed turns.

Returning to FIG. 3A. In an alternative embodiment, the processor of the personal navigation device may be configured to query the central server for difficulty information regarding specific turns in a planned or calculated route. In this embodiment, instead of the personal navigation device storing a difficult turn database, the processor may be configured to access a difficult turn database in block 308 by sending a query to a central server where the database is maintained. Thus, after planning a driving route in block 306 of method 300, the processor may forward some or all of the turns along the planned route to a central server, and receive a turn difficulty value or indication for each in block 308. In this embodiment, the central server may use the turn or planned route information received from the personal navigation device to determine a direction of approach to the turn, and use a current time and date to assess the difficulty of each turn from the direction of approach at the current time/date. The central server may also have access to current weather data, which the server may also use in conjunction with the aggregated missed turn data to assess a degree of difficult for each turn identified by the personal navigation device. The server may then return the calculated turn difficulty values or indications to the personal navigation device via a wireless data link in a format that the device can use to issue turn-by-turn directions with enhanced warnings for difficult turns in block 310.

In a further embodiment, portions of the difficult turn database may be stored in memory on each personal navigation device (e.g., those portions within a preset distance of the home of the user) while the rest of the difficult turn database is maintained on the central server in a format that can be queried by personal navigation systems. In this embodiment, enhanced turn-by-turn directions may be generated by the processor using the local difficult turn database so long as that database encompasses a planned route. When a planned route includes turns not listed in the local difficult turn database, such as when the user is planning a trip to another city or state, the processor of the personal navigation system may send messages to the central server requesting difficulty information from the main difficult turn database maintained on the server. This embodiment enables personal navigation devices to provide enhanced turn-by-turn directions across the country even when its memory is not sufficiently large to store a national difficult turn database.

Figure 4:
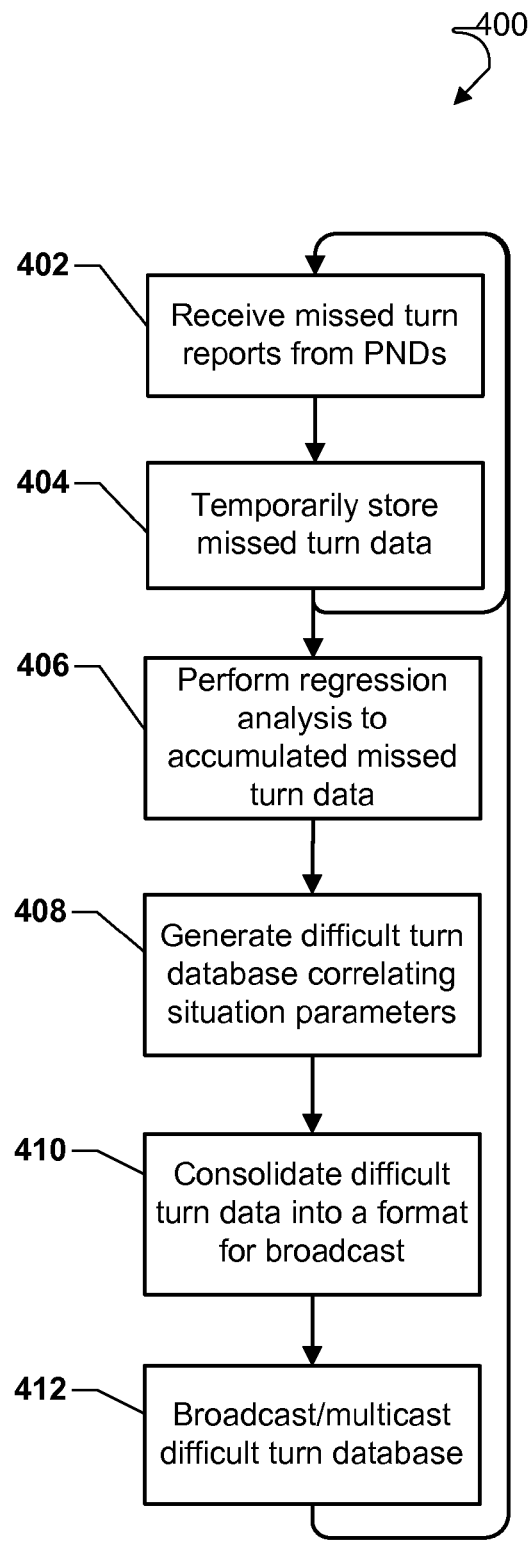
FIG. 4 is a process flow diagram of an embodiment method for aggregating missed turn reports into a difficult turn database for use with the various embodiments.

An embodiment method 400 that may be implemented in a central server for aggregating missed turn reports into a difficult turn database is illustrated in FIG. 4. In method 400 at block 402 the central server may receive missed turn reports from a plurality of personal navigation devices. As discussed above, such reports may be received by the server via the Internet, via cellular data networks and/or WiFi networks, such as in the form of data posting messages according to TCP or HTTP protocols. In block 404, the server may temporarily store received missed turn data, such as to build up a predetermined minimum number of reports in order to facilitate statistical analysis. However, block 404 may not be necessary in embodiments in which the server performs statistical analysis on received missed turn data as such reports are received, such as incrementally updating the records within the difficult turn database. In block 406, the server may analyze the received missed turn data, including all of the associated situation information in order to identify difficult terms and any situations or conditions which make those turns particularly difficult. Any of a variety of statistical analyses may be performed by the server in block 406. For example, the server may perform regression analysis on the accumulated missed turn data to indicate correlations between multiple situation parameters and the frequency of reported missed turns in order to generate the information included within the missed turn database.

Using the results of this the statistical analyses performed in block 406, the server may generate the difficult turns database including a difficulty value or indication for each identified difficult turn as well as correlated situation parameters in block 408. This database may be structured to enable queries for particular turns with specified situation parameters. In block 410, the server may format, consolidate or subdivide the difficult turn database into a format suitable for broadcast or multicast to personal navigation devices. Since personal navigation devices have limited memory capacity, the consolidation/subdividing operations in block 410 may include reducing the size of the database that is broadcast or multicast in order to fit within the memory capacity typical personal navigation devices. For example, the server may generate, for broadcast or multicast to personal navigation devices owned by users living within a particular region, a subset of the difficult turn database comprising data records for turns within that region. In block 412, the server may broadcast or multicast the difficult turn database to personal navigation devices. In embodiments in which the server multicast/broadcast a subset of the difficult turn database comprising turns within a specific region, subset database transmissions may be targeted to specific personal navigation devices known to reside within the regions for which the subset is prepared.

The process of receiving missed turn reports, refining the missed turn database and transmitting updates to personal navigation devices may be continuous so that the database is always being refined. Thus, the server may return to block 400 to continue to receive missed turn reports from personal navigation devices. This manner, the difficult turn database can continue to be refined to reflect the current characteristics of turns, which may be affected by road construction, growth or removal of that vegetation, nearby building construction or demolition, installation of new streetlights, additions of street signs, and other changes that may affect the drivers' abilities to make particular turns under various conditions.

Figure 8:
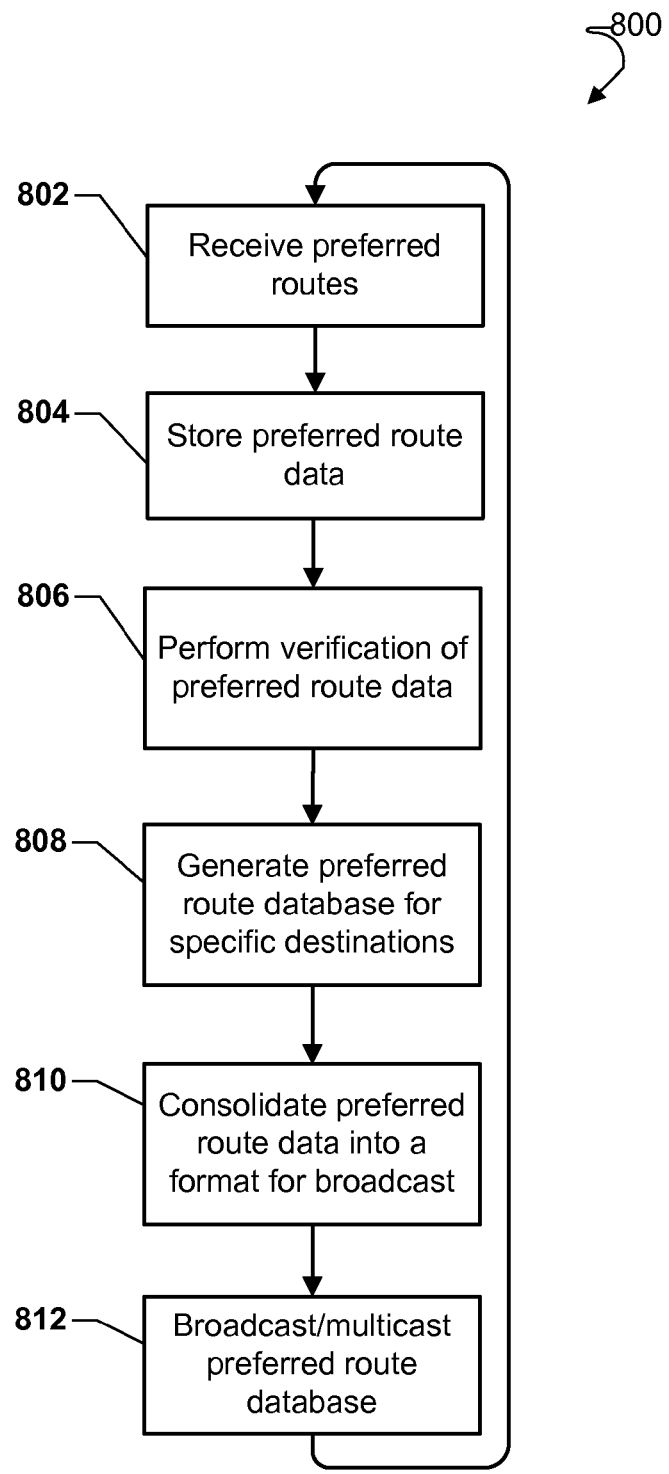
FIG. 8 is a process flow diagram on an embodiment method for generating a preferred route database.

Referring to FIGS. 3, 5, 6 and 7, in an alternative embodiment, the operations of planning a driving route (blocks 306, 504, and 602) may include accessing a database of preferred routes associated with specific destinations. For example, even if no turns on the route to a restaurant may be considered difficult, it may be preferable to approach the restaurant from a specific side street because the parking lot for the restaurant is located off that side street instead of off the street where the restaurant itself is located. The owner of the restaurant, the landlord, or patrons may upload preferred routes to the central server via the Internet. An embodiment method 800 that may be implemented in a central server for receiving and aggregating preferred routes into a preferred route database is illustrated in FIG. 8. In method 800 at block 802 the central server may receive preferred routes from a plurality of personal navigation devices or other computing devices. As discussed above, such reports may be received by the server via the Internet, via cellular data networks and/or WiFi networks, such as in the form of data posting messages according to TCP or HTTP protocols. In block 804, the server may store preferred route data. In block 806, the server may perform verification of received preferred routes. Any of a variety of statistical analyses may be performed by the server in block 806. For example, the server may consider a preferred route to be verified if the same or substantially similar route is received from a predetermined number of independent submitters.

Once the processor has verified the preferred route, in block 808, the processor may generate a database of preferred routes for specific destinations. This database may be structured to enable queries by personal navigation systems for particular destinations. In block 810, the server may format, consolidate or subdivide the preferred route database into a format suitable for broadcast or multicast to personal navigation devices. Since personal navigation devices have limited memory capacity, the consolidation/subdividing operations in block 810 may include reducing the size of the database that is broadcast or multicast in order to fit within the memory capacity typical personal navigation devices. For example, the server may generate, for broadcast or multicast to personal navigation devices owned by users living within a particular region, a subset of the preferred route database comprising data records for destination within that region. In block 812, the server may broadcast or multicast the preferred route database to personal navigation devices. In embodiments in which the server multicast/broadcast a subset of the preferred route database comprising destinations within a specific region, subset database transmissions may be targeted to specific personal navigation devices known to reside within the regions for which the subset is prepared. Thereafter, personal navigation system may generate turn-by-turn directions to destinations listed in the preferred route database, and thereby automatically direct users along the route that is preferred by others.

Figure 9:
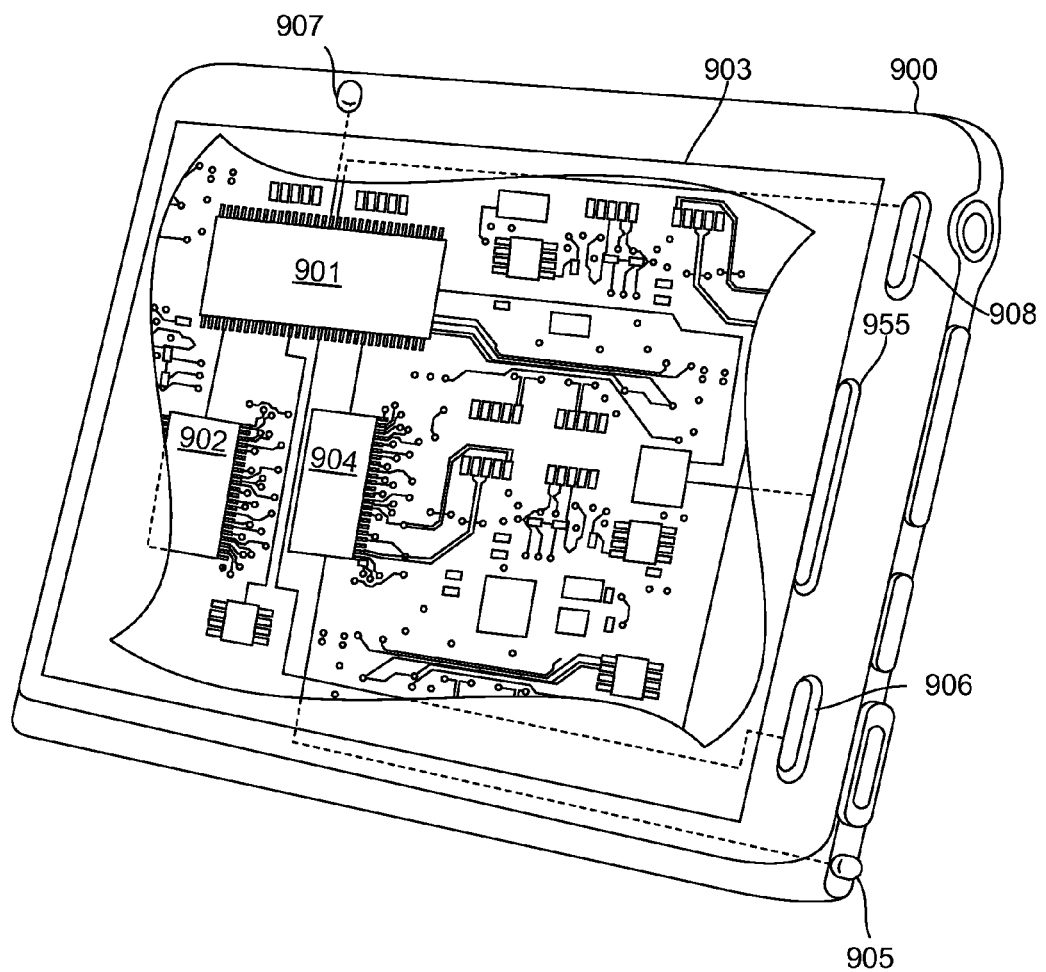
FIG. 9 is a perspective view of a computing device suitable for use as a personal navigation device in various aspects.

FIG. 9 is a system block diagram of a personal navigation device suitable for use with any of the aspects. A typical personal navigation device 900 may include a processor 901 coupled to internal memory 902, a display 903, and to a speaker 955. Additionally, the personal navigation device 500 may include an antenna 904 for sending and receiving electromagnetic radiation that may be connected to a wireless data link and/or cellular telephone transceiver 905 coupled to the processor 901, a mobile multimedia broadcast receiver 906 coupled to the processor 901 and environmental sensors 907 coupled to the processor 901. Personal navigation devices 900 typically also include one or more menu selection buttons or rocker switches 908 for receiving user inputs.

The processor 901 may be any programmable microprocessor, microcomputer or multiple processor chip or chips that can be configured by software instructions (applications) to perform a variety of functions, including the functions of the various aspects described above. In some devices, multiple processors 901 may be provided, such as one processor dedicated to wireless communication functions and one processor dedicated to running other applications. Typically, software applications and data may be stored in the internal memory 902 before they are accessed and loaded into the processor 901. The processor 901 may include internal memory sufficient to store the application software instructions. In many devices the internal memory may be a volatile or nonvolatile memory, such as flash memory, or a mixture of both. For the purposes of this description, a general reference to memory refers to memory accessible by the processor 901 including internal memory or removable memory plugged into the device and memory within the processor 901 itself.

Figure 10:
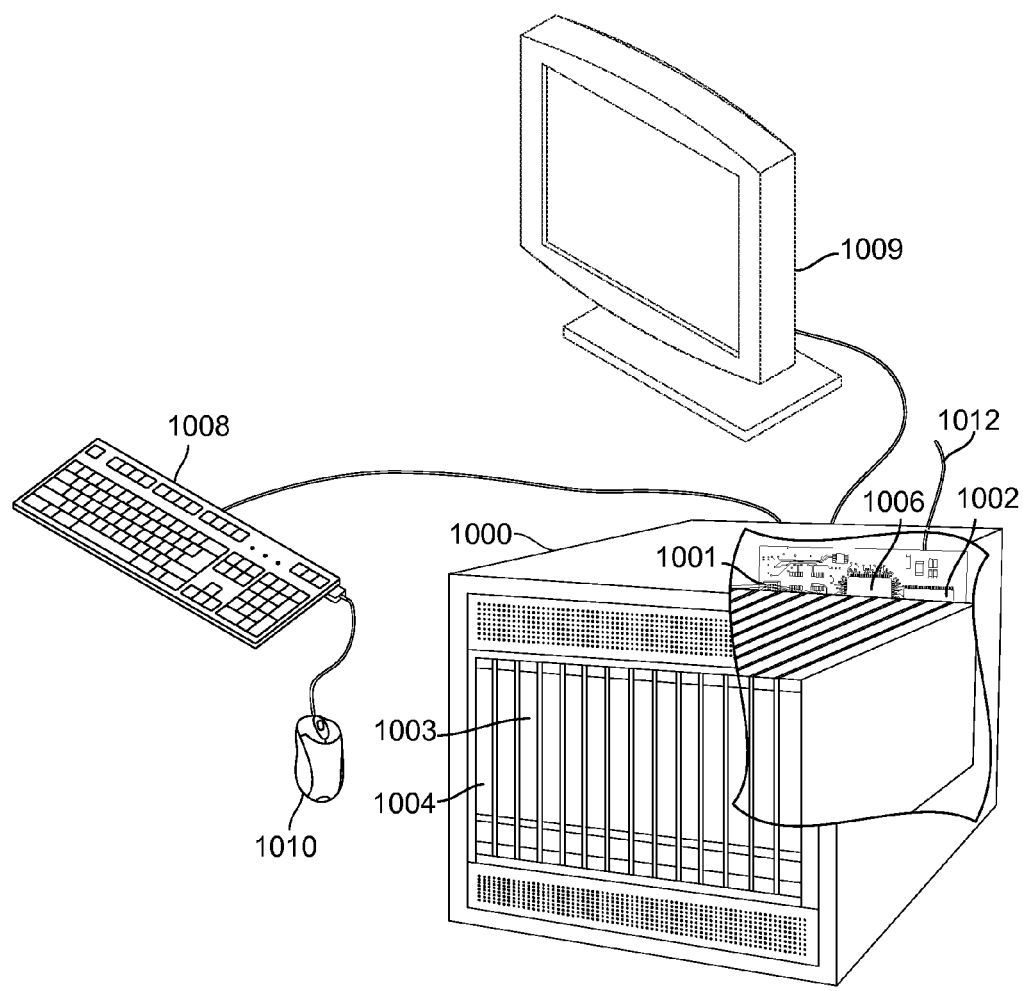
FIG. 10 is a perspective view of a computing device suitable for use as a server in various aspects.

The various embodiments may be implemented on of a variety of commercially available servers, such as the example server illustrated in FIG. 10. A central server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1006 coupled to the processor 1001 for establishing data connections with a network 1012, such as a local area network coupled to other broadcast system computers and servers. Servers 1000 may also include operator interfaces, such as a keyboard 1008, pointer device (e.g., a computer mouse 1010), and a display 1009.

The foregoing method descriptions and the process flow diagrams are provided merely as illustrative examples and are not intended to require or imply that the operations or steps of the various aspects must be performed in the order presented. As will be appreciated by one of skill in the art the order of blocks in the foregoing aspects may be performed in any order. Words such as "thereafter," "then," "next," etc. are not intended to limit the order of the operations or steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The aspect methods described herein may be implemented in a computing device by configuring a processor of the computing device with processor-executable instructions to perform the operations of the method. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the operations and functions described may be implemented in hardware, software, firmware, or any combination thereof. If implemented in software, the functions may be stored on as one or more processor-executable or server-executable instructions or code on a non-transitory computer-readable medium. The operations of a method or algorithm disclosed herein may be embodied in a processor-executable or server-executable software module which may be stored on a non-transitory computer-readable medium or processor-readable medium. Non-transitory computer-readable and processor-readable media may be any available storage media that may be accessed by a computer or processor. By way of example, and not limitation, such non-transitory computer-readable media may include RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method for providing enhanced turn-by-turn directions by a personal navigation device, comprising:
    accessing a database of difficult turns with the personal navigation device to obtain a difficulty indication for an upcoming turn along a planned route of travel, wherein the difficulty indication indicates a likelihood of unintentionally missing the upcoming turn;
    determining on the personal navigation device whether the difficulty indication for the upcoming turn exceeds a threshold; and
    issuing enhanced directions for the upcoming turn with the personal navigation device in response to the difficulty indication for the upcoming turn exceeding the threshold.

2. The method of claim 1, wherein accessing a database of difficult turns with the personal navigation device comprises accessing with the personal navigation device a local database of difficult turns stored on the personal navigation device.

3. The method of claim 1, wherein accessing a database of difficult turns with the personal navigation device comprises accessing with the personal navigation device a local database of difficult turns stored on the personal navigation device using situation parameters comprising at least one of time of day, day of year, weather conditions, outside temperature, traffic conditions, lighting conditions, speed of travel, direction of travel, and vehicle type.

4. The method of claim 3, further comprising gathering information with the personal navigation device regarding one or more situation parameters, wherein accessing with the personal navigation device a local database of difficult turns stored on the personal navigation device using situation parameters comprises accessing with the personal navigation device the local database of difficult turns using the gathered information.

5. The method of claim 1, wherein accessing a database of difficult turns with the personal navigation device comprises:
    sending a request for an indication of difficulty for a particular turn from the personal navigation device to a server on which is maintained a database of difficult turns, the request identifying the turn; and
    receiving on the personal navigation device a difficulty indication for the particular turn from the server.

6. The method of claim 1, wherein issuing enhanced directions for the upcoming turn with the personal navigation device comprises providing a user with at least one of an earlier warning that a difficult turn is ahead and information regarding the difficulty of the upcoming turn with the personal navigation device.

7. The method of claim 1, further comprising determining from a local driving database on the personal navigation device whether a user of the personal navigation device is familiar with the upcoming turn, wherein issuing enhanced directions for the upcoming turn with the personal navigation device is only accomplished when the user of the personal navigation device is unfamiliar with the upcoming turn.

8. The method of claim 1, further comprising:
    determining with the personal navigation device whether one or more turns along the planned route exceed a difficulty threshold; and
    planning a new route with the personal navigation device in response to one or more of turns along the planned route exceeding a difficulty threshold.

9. A personal navigation device, comprising:
    a display;
    a memory; and
    a processor coupled to the display and to the memory and configured with processor-executable instructions to perform operations comprising:
        accessing a database of difficult turns to obtain a difficulty indication for an upcoming turn along a planned route of travel, wherein the difficulty indication indicates a likelihood of unintentionally missing the upcoming turn;
        determining whether the difficulty indication for the upcoming turn exceeds a threshold; and
        issuing enhanced directions for the upcoming turn in response to the difficulty indication for the upcoming turn exceeding the threshold.

10. The personal navigation device of claim 9, wherein the processor is configured with processor-executable instructions to perform operations such that accessing a database of difficult turns comprises accessing a local database of difficult turns stored on the memory.

11. The personal navigation device of claim 9, wherein the processor is configured with processor-executable instructions to perform operations such that accessing a database of difficult turns comprises accessing a local database of difficult turns stored in the memory using situation parameters comprising at least one of time of day, day of year, weather conditions, outside temperature, traffic conditions, lighting conditions, speed of travel, direction of travel, and vehicle type.

12. The personal navigation device of claim 11, wherein the processor is configured with processor-executable instructions to perform operations further comprising gathering information regarding one or more situation parameters,
wherein the processor is configured with processor-executable instructions to perform operations such that accessing a local database of difficult turns stored in the memory using situation parameters comprises accessing the local database of difficult turns using the gathered information.

13. The personal navigation device of claim 9, wherein the processor is configured with processor-executable instructions to perform operations such that accessing a database of difficult turns comprises:
sending a request for an indication of difficulty for a particular turn to a server on which is maintained a database of difficult turns, the request identifying the turn; and
receiving a difficulty indication for the particular turn from the server.

14. The personal navigation device of claim 9, wherein the processor is configured with processor-executable instructions to perform operations such that issuing enhanced directions for the upcoming turn comprises providing a user with at least one of an earlier warning that a difficult turn is ahead and information regarding the difficulty of the upcoming turn.

15. The personal navigation device of claim 9, wherein the processor is configured with processor-executable instructions to perform operations further comprising determining from a local driving database whether a user of the personal navigation device is familiar with the upcoming turn,
wherein the processor is configured with processor-executable instructions to perform operations such that issuing enhanced directions for the upcoming turn is only accomplished when it is determined that the user of the personal navigation device is unfamiliar with the upcoming turn.

16. The personal navigation device of claim 9, wherein the processor is configured with processor-executable instructions to perform operations further comprising:
determining whether one or more turns along the planned route exceed a difficulty threshold; and
planning a new route in response to one or more of turns along the planned route exceeding a difficulty threshold.

17. The personal navigation device of claim 9, wherein the processor is configured with processor-executable instructions to perform operations further comprising:
determining when a turn is missed during turn-by-turn directions;
determining whether the missed turn was missed unintentionally;
gathering situation information related to the missed turn; and
transmitting to a server a missed turn report identifying the term that was missed and including at least some of the gathered situation information.

18. A personal navigation device, comprising:
means for accessing a database of difficult turns to obtain a difficulty indication for an upcoming turn along a planned route of travel, wherein the difficulty indication indicates a likelihood of unintentionally missing the upcoming turn;
means for determining whether the difficulty indication for the upcoming turn exceeds a threshold; and
means for issuing enhanced directions for the upcoming turn in response to the difficulty indication for the upcoming turn exceeding the threshold.

19. The personal navigation device of claim 18, wherein means for accessing a database of difficult turns comprises means for accessing a local database of difficult turns stored on the personal navigation device.

20. The personal navigation device of claim 18, wherein means for accessing a database of difficult turns comprises means for accessing a local database of difficult turns stored on the personal navigation device using situation parameters comprising at least one of time of day, day of year, weather conditions, outside temperature, traffic conditions, lighting conditions, speed of travel, direction of travel, and vehicle type.

21. The personal navigation device of claim 20, further comprising means for gathering information regarding one or more situation parameters,
wherein means for accessing a local database of difficult turns stored on the personal navigation device using situation parameters comprises means for accessing the local database of difficult turns using the gathered information.

22. The personal navigation device of claim 18, wherein means for accessing a database of difficult turns comprises:
means for sending a request for an indication of difficulty for a particular turn to a server on which is maintained a database of difficult turns, the request identifying the turn; and
means for receiving a difficulty indication for the particular turn from the server.

23. The personal navigation device of claim 18, wherein means for issuing enhanced directions for the upcoming turn comprises means for providing a user with at least one of an earlier warning that a difficult turn is ahead and information regarding the difficulty of the upcoming turn.

24. The personal navigation device of claim 18, comprising means for determining from a local driving database whether a user of the personal navigation device is familiar with the upcoming turn,
wherein means for issuing enhanced directions for the upcoming turn comprises means for issuing enhanced directions for the upcoming turn only accomplished when the user of the personal navigation device is unfamiliar with the upcoming turn.

25. The personal navigation device of claim 18, further comprising:
means for determining whether one or more turns along the planned route exceed a difficulty threshold; and
means for planning a new route in response to one or more of turns along the planned route exceeding a difficulty threshold.

26. The personal navigation device of claim 18, further comprising:
means for determining when a turn is missed during turn-by-turn directions;
means for determining whether the missed turn was missed unintentionally;

means for gathering situation information related to the missed turn; and means for transmitting to a server a missed turn report identifying the term that was missed and including at least some of the gathered situation information.

27. A non-transitory processor-readable storage medium having stored thereon processor executable instructions configured to cause a personal navigation device processor to perform operations comprising:
   accessing a database of difficult turns to obtain a difficulty indication for an upcoming turn along a planned route of travel, wherein the difficulty indication indicates a likelihood of unintentionally missing the upcoming turn;
   determining whether the difficulty indication for the upcoming turn exceeds a threshold; and
   issuing enhanced directions for the upcoming turn in response to the difficulty indication for the upcoming turn exceeding the threshold.

28. The non-transitory processor-readable storage medium of claim 27, wherein the stored processor executable instructions are configured to cause the personal navigation device processor to perform operations such that accessing a database of difficult turns comprises accessing a local database of difficult turns stored on the personal navigation device.

29. The non-transitory processor-readable storage medium of claim 27, wherein the stored processor executable instructions are configured to cause the personal navigation device processor to perform operations such that accessing a database of difficult turns comprises accessing a local database of difficult turns stored on the personal navigation device using situation parameters comprising at least one of time of day, day of year, weather conditions, outside temperature, traffic conditions, lighting conditions, speed of travel, direction of travel, and vehicle type.

30. The non-transitory processor-readable storage medium of claim 29, wherein the stored processor executable instructions are configured to cause the personal navigation device processor to perform operations further comprising gathering information regarding one or more situation parameters,
   wherein the stored processor executable instructions are configured to cause the personal navigation device processor to perform operations such that accessing a local database of difficult turns stored on the personal navigation device using situation parameters comprises accessing the local database of difficult turns using the gathered information.

31. The non-transitory processor-readable storage medium of claim 27, wherein the stored processor executable instructions are configured to cause the personal navigation device processor to perform operations further comprising:
   determining when a turn is missed during turn-by-turn directions;
   determining whether the missed turn was missed unintentionally;
   gathering situation information related to the missed turn; and
   transmitting to the server a missed turn report identifying the term that was missed and including at least some of the gathered situation information.

32. The non-transitory processor-readable storage medium of claim 27, wherein the stored processor executable instructions are configured to cause the personal navigation device processor to perform operations further comprising:
   sending a request for an indication of difficulty for a particular turn to a server on which is maintained a database of difficult turns, the request identifying the turn; and
   receiving a difficulty indication for the particular turn from the server.

33. The non-transitory processor -readable storage medium of claim 27, wherein the stored processor executable instructions are configured to cause the personal navigation device processor to perform operations such that issuing enhanced directions for the upcoming turn comprises providing a user with at least one of an earlier warning that a difficult turn is ahead and information regarding the difficulty of the upcoming turn.

34. The non-transitory processor-readable storage medium of claim 27, wherein the stored processor executable instructions are configured to cause the personal navigation device processor to perform operations further comprising determining from a local driving database whether a user of the personal navigation device is familiar with the upcoming turn,
   wherein the stored processor executable instructions are configured to cause the personal navigation device processor to perform operations such that issuing enhanced directions for the upcoming turn is only accomplished when the user of the personal navigation device is unfamiliar with the upcoming turn.

35. The non-transitory processor-readable storage medium of claim 27, wherein the stored processor executable instructions are configured to cause the personal navigation device processor to perform operations further comprising:
   determining whether one or more turns along the planned route exceed a difficulty threshold; and
   planning a new route in response to one or more of turns along the planned route exceeding a difficulty threshold.

* * * * *